(12) United States Patent
Lin

(10) Patent No.: US 8,892,956 B2
(45) Date of Patent: Nov. 18, 2014

(54) ELECTRONIC DEVICE AND METHOD FOR MANAGING TEST RESULTS

(75) Inventor: Sheng-Han Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 341 days.

(21) Appl. No.: 13/313,001

(22) Filed: Dec. 7, 2011

(65) Prior Publication Data

US 2012/0192012 A1    Jul. 26, 2012

(30) Foreign Application Priority Data

Jan. 24, 2011   (TW) .............. 100102435 A

(51) Int. Cl.
  *G06F 11/00* (2006.01)
  *G06F 11/22* (2006.01)

(52) U.S. Cl.
  CPC ........ *G06F 11/2268* (2013.01); *G06F 11/2221* (2013.01)
  USPC .............................. 714/42; 714/45

(58) Field of Classification Search
  CPC ............ G06F 11/2221; G06F 11/2268; G06F 11/3688; G06F 11/263; G06F 11/0709; G06F 11/0778; G06F 11/0781; G06F 19/321; G06F 19/322; G06F 19/3406; G06F 19/363; G06F 9/52; G06F 11/2273; G06F 11/267; G06F 11/2733

USPC ...................................................... 714/42–46
  See application file for complete search history.

(56) References Cited

U.S. PATENT DOCUMENTS

| | | | |
|---|---|---|---|
| 7,451,358 B2* | 11/2008 | Grey et al. ...................... | 714/45 |
| 7,698,603 B2* | 4/2010 | Staneff ............................ | 714/45 |
| 8,386,205 B2* | 2/2013 | Lin ................................ | 702/108 |
| 2003/0212517 A1* | 11/2003 | Liau ................................ | 702/82 |
| 2003/0237032 A1* | 12/2003 | Adler et al. ..................... | 714/718 |
| 2005/0107987 A1* | 5/2005 | Barr et al. ....................... | 702/186 |
| 2006/0230318 A1* | 10/2006 | Grey ................................ | 714/38 |
| 2010/0115342 A1* | 5/2010 | Shigeta et al. .................. | 714/37 |
| 2011/0138227 A1* | 6/2011 | Lin .................................. | 714/32 |

* cited by examiner

*Primary Examiner* — Bryce Bonzo
*Assistant Examiner* — Elmira Mehrmanesh
(74) *Attorney, Agent, or Firm* — Novak Druce Connolly Bove + Quigg LLP

(57) ABSTRACT

In a method for managing test results of an electronic device, the electronic device includes one or more expansion slots. The method selects a hard disk drive to insert into each expansion slot, executes a read-write test on each expansion slot, and saves test result(s) of the tests on each expansion slot into a file. Before managing the test results, the method sets a file name for each expansion slot for which test results is to be managed, and selects a test item from the read-write test. The method determines test results which expansion slots with are required to be managed and determines a test order of the expansion slots. After the test results are imported, the method amends a file name corresponding to each expansion slot according to the test order, and manages the test results of each expansion slot.

12 Claims, 4 Drawing Sheets

ELECTRONIC DEVICE AND METHOD FOR MANAGING TEST RESULTS

BACKGROUND

1. Technical Field

Embodiments of the present disclosure generally relate to management of data from testing devices and methods, and particularly to an electronic device and method for managing test results related to the electronic device.

2. Description of Related Art

During design of a server or a storage system, hard disk drives made by different manufacturers are required to be tested one by one in a storage system. The test demands heavy use of manpower, recourses to material and lengthy application time, and the sufficiency of the tests cannot be guaranteed.

DETAILED DESCRIPTION

In general, the term "module," as used herein, refers to logic embodied in hardware or firmware, or to a collection of software instructions, written in a programming language, such as, for example, Java, C, or assembly. One or more software instructions in the modules may be embedded in firmware, such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable medium or computer storage device.

Figure 1:
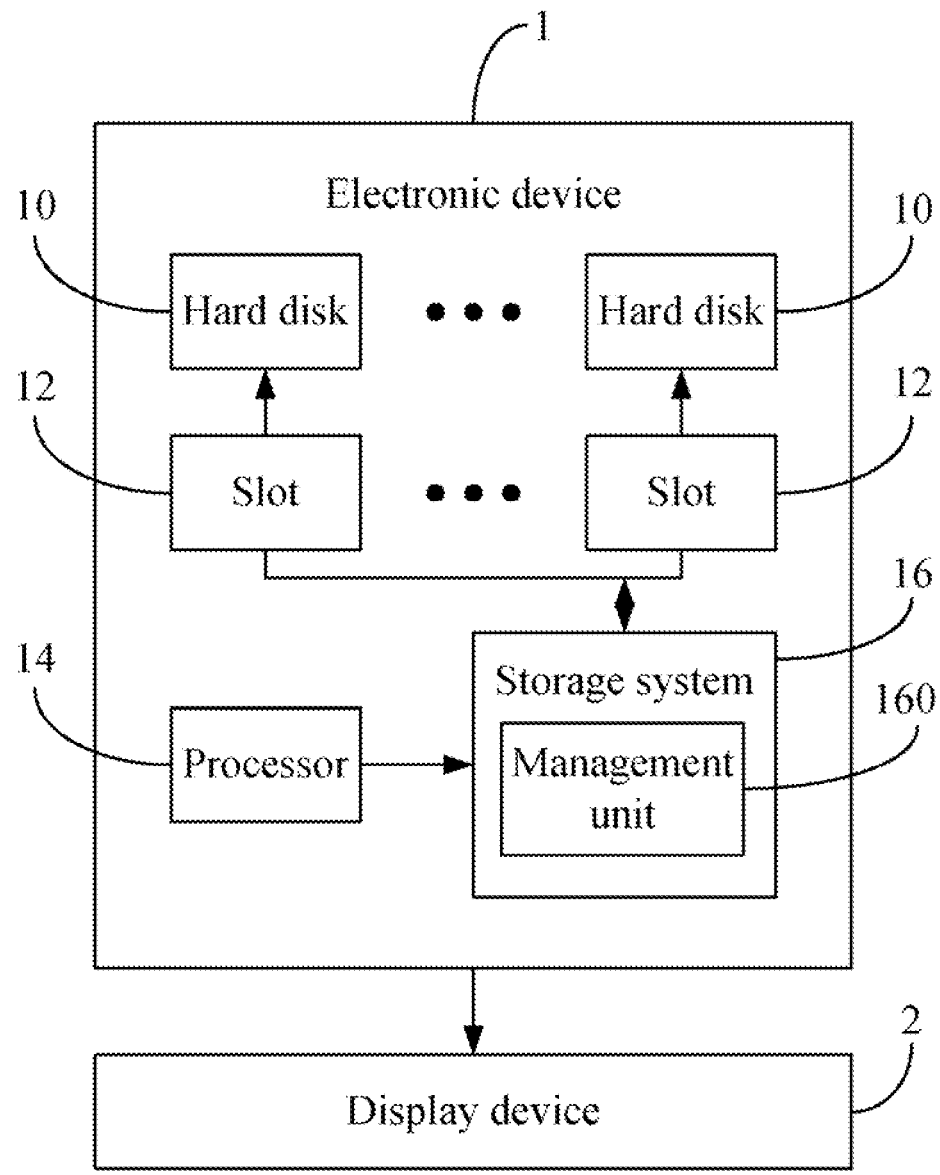
FIG. 1 is a block diagram of one embodiment of an electronic device including a management unit.

FIG. 1 is a block diagram of one embodiment of an electronic device 1 including a management unit 160. In the embodiment, functions of the management unit 160 are implemented by the electronic device 1. The management unit 160 can test performance of the electronic device 1, and manage results of the test, which include results of testing one or more hard disk drives 10 and results of testing expansion slots 12 configured to receive the hard disk drives 10.

In the embodiment, the expansion slots 12 may be tested to see whether the hard disk drives 10 may be subjected to voltage surges when the hard disk drives 10 are received in the expansion slots 12. In the embodiment, the test results may generation of a test report. Detailed functions of the management unit 160 are described below (and with reference to FIG. 2).

In the embodiment, the electronic device 1 is electronically connected to a display device 2. The display device 2 displays interfaces for the setting and resetting of parameters relevant to tests, and displays progress of the test and the test report(s). In one embodiment, the electronic device 1 may be a computer, a server, a portable electronic device, or any other computing device that includes at least one processor (e.g. a processor 14) and a storage system (e.g. a storage system 16).

Figure 2:
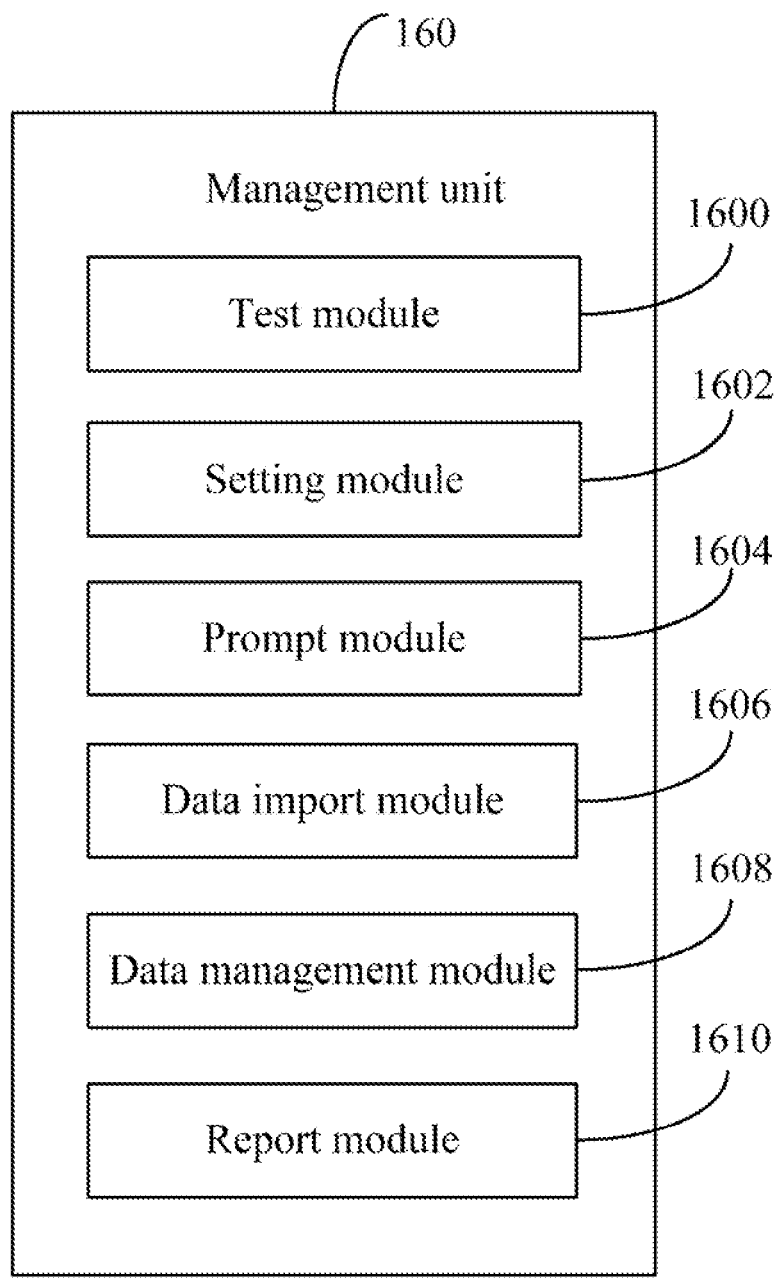
FIG. 2 is a block diagram of one embodiment of function modules of the management unit of FIG. 1.

FIG. 2 is a block diagram of one embodiment of function modules of the management unit 160 of FIG. 1. In one embodiment, the management unit 160 includes a test module 1600, a setting module 1602, a prompt module 1604, a data import module 1606, a data management module 1608, and a report module 1610. Each of the modules 1600-1610 may be a software program including one or more computerized instructions that are stored in the storage system 16 and executed by the processor 14.

The test module 1600 receives a selection of a hard disk drives 10 from the hard disk drives 10 included in the electronic device 1. In the embodiment, the selection can be user-selectable on which to perform a rapid virtualization indexing (RVI) test. The RVI test is a test with a hardware-assisted virtualization technology for testing performance of the electronic device 1. The selected hard disk drives 10 may be inserted into each one of the expansion slots 12 in order to test the expansion slots 12. The test module 1600 executes a read-write test on each expansion slot 12 that receives the selected hard disk drives 10 by performing a test program, and saves the test results relating to the expansion slot 12 in a provisionally named-file. In the embodiment, the test program may be an IOmeter program carried out as part of the RVI test, and the read-write test may be a 4K random-write test, or a 64K random-write test, for example.

In one embodiment, if the electronic device 1 has twenty-four expansion slots 12 and each of the expansion slots 12 has seven different potential tests, the test module 1600 tests each of the twenty-four expansion slots 12 carrying a hard disk drives 10 and obtains 24*7=168 items of test results. Each of the twenty-four expansion slots 12 corresponds to a file for storing the test results of seven different tests. In the embodiment, each of the files has a different file name, which is composed of a title, a notation and a name. Once allocated, the title is fixed, but the name is a variable. For example, if the file name of one file is "TestHDD-Hitachi147G_bay00-SAJ_4KRR," then "TestHDD-Hitachi147G" is the title, "_" is the Notation, and "bay00-SAJ_4KRR" is the (variable) name.

When the user wants to acquire and manage test results of one or more expansion slots 12 (hereinafter referred to as "expansion slots B"), the setting module 1602 gives a file name to one of the expansion slots B, and selects a test from the read-write test to be applied and the test results to be managed.

The setting module 1602 further sets the total number of expansion slots 12 to be tested and the first expansion slot 12 to undergo testing, to determine the total test results which are required to be managed and to determine a test order of the expansion slots 12. In the embodiment, the setting module 1602 can estimate all the file names relating to the expansion slots 12 to be managed, according to the set file name and the test order of the expansion slots 12. The test order is defined as an order of which of the expansion slots 12 gets test first, second, third, and so on.

In the embodiment, in the test program, the setting module 1602 further sets the total number of hard disk drives 10 to be selected and an initial insertion-position of each of the hard disk drives 10. By setting the initial insertion-position of each of the hard disk drives 10 and the total number of the hard disk drives 10, all the hard disk drives 10 for testing can be determined.

The prompt module 1604 displays a prompt on the display device 2 for the user to set working parameters of the test program. The working parameters may include the total number of the expansion slots 12 and the total number of the hard disk drives 10, for example. The prompt module 1604 can request the user (i.e., pop a box on the display device 2) to confirm whether the set working parameters satisfy test requirements desired by the user. In the embodiment, the prompt module 1604 can further indicate errors, such as displaying the errors on the display device 2. For example, if the file name has been set wrong, if one of the tests has not been executed, if the total number of the expansion slots 12 or if the total number of the hard disk drives 10 is wrong.

The data import module 1606 imports the test results of each of the expansion slots 12 tested under the read-write test from the provisionally named-file according to a predefined time period. For example, if the expansion slots 12 to be managed are the tenth expansion slot to the twenty-fourth expansion slot of all the expansion slots 12, and the selected test is the 4K random-write test, the data import module 1606 imports the test results of the tenth expansion slot tested from the file of the tenth expansion slot, and imports the test results of the eleventh expansion slot tested under the 4K read-write test from the file of eleventh expansion slot, and so the procedure continues.

The data management module 1608 changes parts of the file name corresponding to each expansion slot 12 according to the test order, manages the test results of each expansion slot 12 by correlating the test results of each expansion slot 12 with a file name. When the test has been finished, the prompt module 1604 indicates the completion of that part of the management.

The report module 1610 generates a test report by saving the test results of each expansion slot 12 and a corresponding file name in a data sheet of predefined format, such as an EXCEL data sheet.

Figure 3:
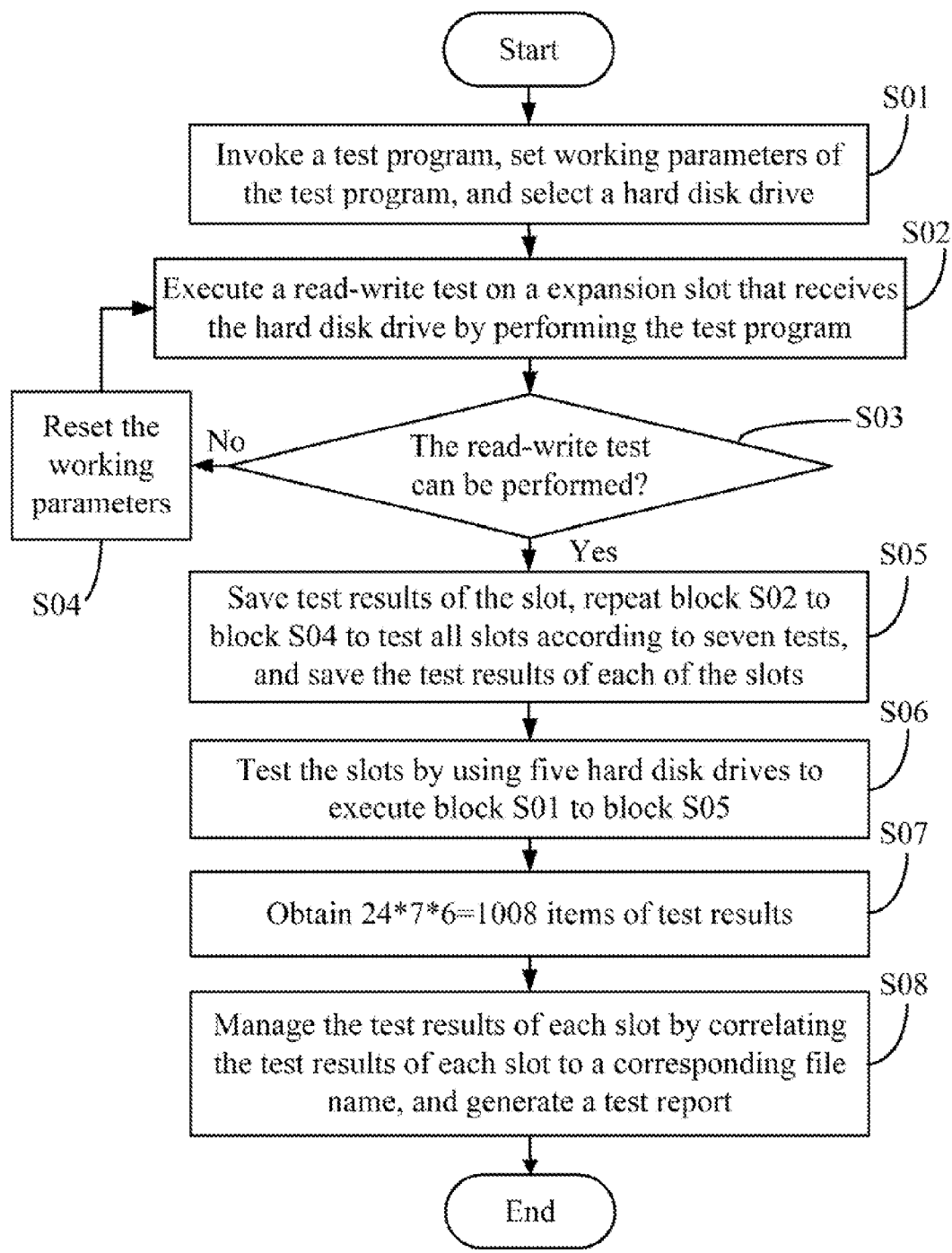
FIG. 3 is a flowchart illustrating one embodiment of a method for managing test results of the electronic device of FIG. 1.

FIG. 3 is a flowchart illustrating one embodiment of a method for managing test results. Depending on the embodiment, additional blocks may be added, others removed, and the ordering of the blocks may be changed.

In block S01, the test module 1600 invokes a test program to carry out a RVI test, sets working parameters of the test program, and receives a selection of a hard disk drive 10 from all the hard disk drives 10 included in the electronic device 1. In the embodiment, the test program may be an IOmeter program, and a user can randomly select one of the hard disk drives 10 to which the RVI test can be applied.

In block S02, the test module 1600 executes a read-write test on the expansion slot 12 by performing the test program when one of the expansion slots 12 of the electronic device 1 has received the selected hard disk drive 10.

In block S03, the test module 1600 determines whether the read-write test can be performed. If the read-write test on that particular expansion slot cannot be performed, block S04 is implemented. If the read-write test on the expansion slot can be performed, block S05 is implemented. In the embodiment, the read-write test has more than one test items. For example, the read-write test has seven test items, and the electronic device 1 has twenty-four expansion slots.

In block S04, the test module 1600 resets the working parameters of the test program, and block S02 is repeated. In block S05, the test module 1600 saves the test results of the expansion slot 12 in a provisionally named-file, repeats block S02 to block S04 to test all the expansion slots 12 of the electronic device 1 according to the seven test items of the read-write test, and saves the test results of each of the expansion slots into a corresponding provisionally named-file.

In the embodiment, each of the expansion slots 12 will have one file for storing the test results of seven different tests applied to that particular expansion slot. Supposing that five hard disk drives 10 can be used for testing the expansion slots 12, then in block S06, the test module 1600 tests each of the expansion slots 12 by using each of the five hard disk drives 10 to carry out the functions required by block S01 to block S05. In block S07, the test module 1600 obtains 24*7*6=1008 individual items of test results.

In managing the test results of one or more expansion slots 12, in block S08, the data management module 1608 correlates the test results of each of the expansion slots 12 to a corresponding file name. The report module 1610 generates a test report by saving the test results of each expansion slot 12 and a corresponding file name in a data sheet of a predefined format, such as an EXCEL data sheet.

Figure 4:
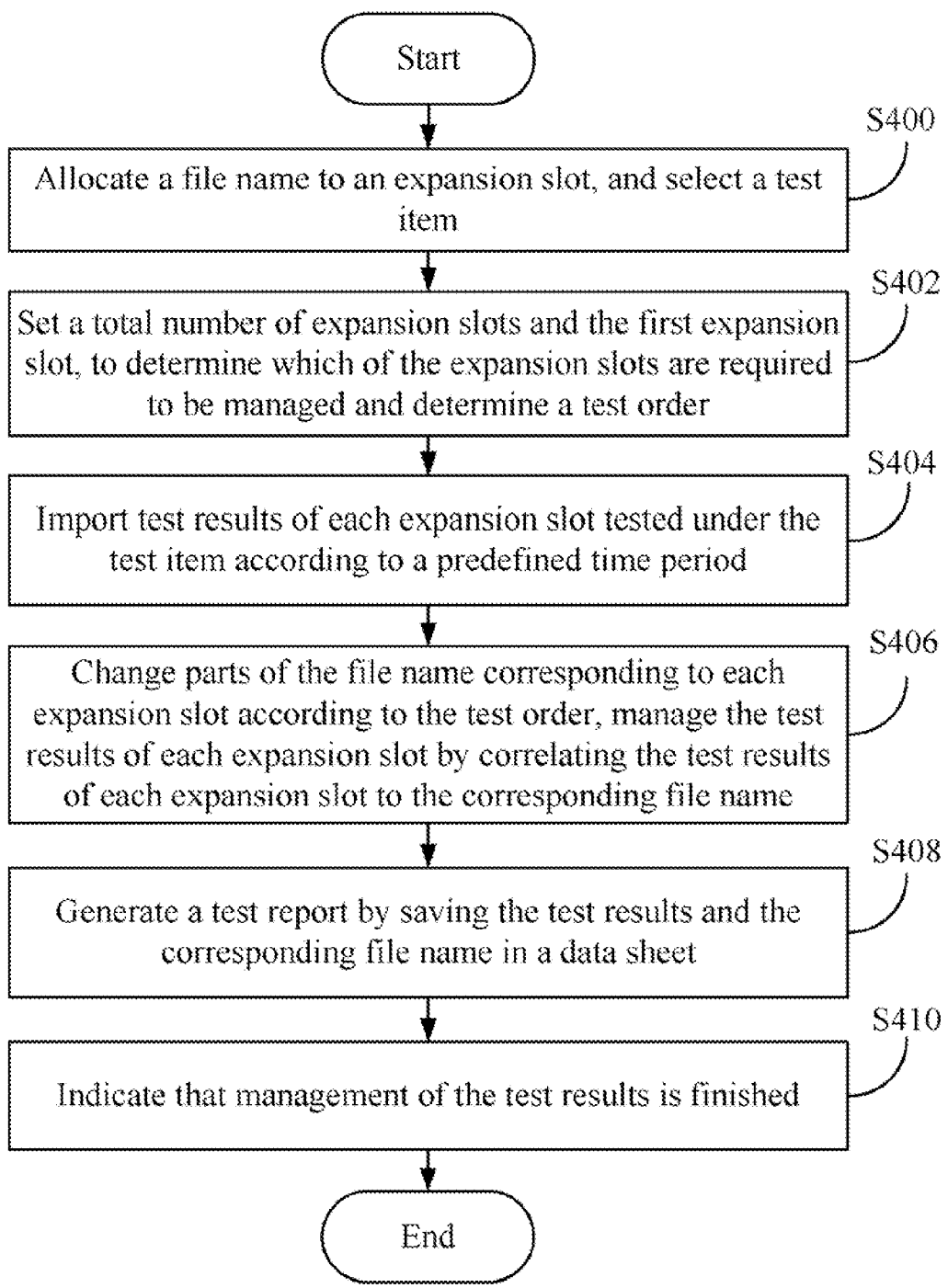
FIG. 4 is a detailed description of block S08 in FIG. 3.

FIG. 4 shows a detailed description of block S08 in FIG. 3, for managing the test results. In block S400, the setting module 1602 allocates a file name to one of the expansion slots B, and selects a test item from the read-write test. In the embodiment, each of the files has a file name that is composed of a title, a notation and a name. The title is fixed, and the name is a variable. For example, if the file name of one file is "TestHDD-Hitachi147G_bay00-SAJ_4KRR," "TestHDD-Hitachi147G" is the title, then "_" is the notation, and "bay00-SAJ_4KRR" is the name.

In block S402, the setting module 1602 sets a total number of the expansion slots 12 and determines the first expansion slot for testing, to determine which of the expansion slots 12 will have test results that are required to be managed, and to determine a test order of the expansion slots 12. The setting module 1602 further sets a total number of the hard disk drives 10 to be selected and an initial or starting position of each of the hard disk drives 10 in the test program. By setting the initial position of each of the hard disk drives 10 and the total number of the hard disk drives 10, all the hard disk drives 10 for testing can be determined.

During the setting process, the prompt module 1604 can display a prompt on the display device 2 for a user to set the working parameters of the test program, and display a prompt on the display device 2 for confirmation that the working parameters as set do satisfy the test requirements of the user. In the embodiment, the prompt module 1604 further indicates any errors on the display device 2. For example, in appropriate situations, the prompt module 1604 can indicate that the file name is set wrong, that a test selected from the read-write test has been not executed, or that the total number of the expansion slots 12 or the total number of the hard disk drives 10 is wrong.

In block S404, the data import module 1606 imports the test results of each of the expansion slots 12 tested under each of the tests according to a predefined time period, such as two seconds.

In block S406, the data management module 1608 changes parts of the file name of each file corresponding to a expansion slot 12 according to the test order, and manages the test results of each expansion slot 12 by correlating the test results with the corresponding file of which part of the name has been changed.

In block S408, the report module 1610 generates a test report by saving the test results of each expansion slot 12 and a file name in the predefined data sheet In block S410, the prompt module 1604 indicates that management of the test results is finished.

All of the processes described above may be embodied in, and fully automated via, functional code modules executed by one or more general purpose processors in many electronic devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital versatile disc, a tape drive or other suitable storage medium.

Although certain inventive embodiments of the present disclosure have been specifically described, the present disclosure is not to be construed as limited thereto. Various changes or modifications may be made to the present disclosure without departing from the scope and spirit of the present disclosure.

What is claimed is:

1. A computer-implemented method for managing test results of an electronic device, the electronic device configured with a plurality of expansion slots, the method comprising:
    executing a read-write test on each of the expansion slots that receives one or more hard disk drives, and saving test results of the read-write tests of each of the expansion slots in a file, the read-write test comprising a plurality of test items;
    setting a file name to one of the expansion slots, and selecting a test item from the read-write test;
    setting a total number of the hard disk drives and an initial insertion-position of each of the hard disk drives in a test program for performing the read-write test, and determining a test order of the expansion slots;
    importing the test results of each of the expansion slots tested under the test item from the file;
    changing a file name corresponding to each of the expansion slots according to the test order of the expansion slots, managing the test results of each of the expansion slots by correlating the test results of each of the expansion slots to the corresponding file name; and
    generating a test report by saving the test results of each of the expansion slots and the corresponding file name in a data sheet having a predefined format.

2. The computer-implemented method as described in claim 1, further comprising:
    displaying a prompt on a display device for a user to set working parameters of the test program; and
    displaying a prompt on the display device for confirmation that the working parameters as set do satisfy test requirements of the user.

3. The computer-implemented method as described in claim 1, further comprising:
    indicating errors on a display device, the errors comprising that the file name of the expansion slot that is set wrong, that a test selected from the read-write test has been not executed, or that a total number of the expansion slots or a total number of the hard disk drives is wrong.

4. The computer-implemented method as described in claim 1, further comprising:
    indicating that management of the test results is finished.

5. An electronic device, comprising:
    a plurality of expansion slots;
    at least one processor;
    a storage system; and
    one or more modules that are stored in the storage system and executed by the at least one processor, the one or more modules comprising:
    a test module operable to execute a read-write test on each of the expansion slots that receives one or more hard disk drives, and save test results of the read-write tests of each of the expansion slots in a file, the read-write test comprising a plurality of test items;
    a setting module operable to set a file name to one of the expansion slots, and select a test item from the read-write test;
    the setting module further operable to set a total number of the hard disk drives and an initial insertion-position of each of the hard disk drives in a test program for performing the read-write test, and determine a test order of the expansion slots;
    a data import module operable to import the test results of each of the expansion slots tested under the test item from the file; and
    a data management module operable to change a file name corresponding to each of the expansion slots according to the test order of the expansion slots, and manage the test results of each of the expansion slots by correlating the test results of each of the expansion slots to the corresponding file name; and
    a report module operable to generate a test report by saving the test results of each of the expansion slots and the corresponding file name in a data sheet having a predefined format.

6. The electronic device as described in claim 5, wherein the one or more modules further comprise a prompt module operable to:
    display a prompt on a display device for a user to set working parameters of the test program; and
    display a prompt on the display device for confirmation that the working parameters as set do satisfy test requirements of the user.

7. The electronic device as described in claim 5, wherein the one or more modules further comprise a prompt module operable to:
    indicate errors on a display device, the errors comprising that the file name of the expansion slot is set wrong, that a test selected from the read-write test has been not executed, or that a total number of the expansion slots or a total number of the hard disk drives is wrong.

8. The electronic device as described in claim 5, wherein the one or more modules further comprise a prompt module operable to:
    indicate that management of the test results is finished.

9. A non-transitory storage medium having stored thereon instructions that, when executed by a processor of an electronic device, causes the processor to perform a method for managing test results, the electronic device configured with a plurality of expansion slots, the method comprising:
    executing a read-write test on each of the expansion slots that receives one or more hard disk drives, and saving test results of the read-write tests of each of the expansion slots in a file, the read-write test comprising a plurality of test items;
    setting a file name to one of the expansion slots, and selecting a test item from the read-write test;
    setting a total number of the hard disk drives and an initial insertion-position of each of the hard disk drives in a test program for performing the read-write test, and determining a test order of the expansion slots;
    importing the test results of each of the expansion slots tested under the test item from the file;
    changing a file name corresponding to each of the expansion slots according to the test order of the expansion slots, and managing the test results of each of the expansion slots by correlating the test results of each of the expansion slots to the corresponding file name; and
    generating a test report by saving the test results of each of the expansion slots and the corresponding file name in a data sheet having a predefined format.

10. The storage medium as described in claim 9, wherein the method further comprises:

displaying a prompt on a display device for a user to set working parameters of the test program; and displaying a prompt on the display device for confirmation that the working parameters as set do satisfy test requirements of the user.

11. The storage medium as described in claim 9, wherein the method further comprises:

indicating errors on a display device, the errors comprising that the file name of the expansion slot is set wrong, that a test selected from the read-write test has been not executed, or that a total number of the expansion slots or a total number of the hard disk drives is wrong.

12. The storage medium as described in claim 9, wherein the method further comprises:

indicating that management of the test results is finished.

* * * * *